Patented Jan. 22, 1935

1,988,478

UNITED STATES PATENT OFFICE 1,988,478

FILTER MEDIUM AND METHOD OF MAKING THE SAME

Bartley E. Broadwell, Lewiston, and Leroy C. Werking, Niagara Falls, N. Y., assignors, by mesne assignments, to National Carbon Company, Inc., New York, N. Y., a corporation of New York No Drawing. Application July 18, 1932, Serial No. 623,300

9 Claims. (Cl. 210—205)

This invention relates to filtering or gas dispersing media, and more particularly to a material for such purposes which consists of an aggregate of more or less solid particles surrounded by or embedded in a porous bond. The invention also relates to a carbon filtering medium which is applicable for many purposes where the usual rigid filtering bodies are either unsatisfactory or cannot be used.

The filtering medium used for most industrial processes consists of particles of a granular material, as for example sand, in which the particles are employed either in a loose condition or as a bonded aggregate. Various woven materials such as fabric or wire cloth, as well as perforated rigid bodies of various types are also used for many applications. All of these filtering media have certain disadvantages, particularly with respect to the clogging of the filter and the failure to remove very finely divided solid material, and these difficulties heretofore have been regarded as more or less inherent in the process of filtering. In the present application a filtering medium is described wherein the difficulties encountered in the case of the usual filters are either minimized or entirely eliminated.

In the usual bonded filter, the bond itself is of a solid or vitreous nature, and the porosity of the filter results from the fact that the quantity of bond is not sufficient to fill the available space between the grains of the aggregate. Filtering thus takes place through the voids between the bond coated particles. In a filter of this type, the pore size not only varies considerably in different parts of the same filter, but the passages through the filter, instead of being channels of uniform diameter through any appreciable part of their length, are merely irregular shaped voids of the same general size and shape as the granular material. These voids are joined by constrictions which vary considerably in size, and the average pore diameter may be very much larger than that of the smallest constrictions within the body of the filter. The solid material being filtered off thus becomes trapped in the circuitous passages between the granular particles, and, as the filtering takes place principally within the body of the material and not at the surface, the filter has a marked tendency to plug. Since the solid residue is trapped within the body of the filter, the removal of the sludge presents a difficult problem.

Another disadvantage of the usual bonded filter resides in the fact that the pore size is dependent upon the packing or arrangement of the particles making up the aggregate. This factor is very difficult to control, and even with a constant grit mix uniformity of structure presents a difficult problem. Aside from the question of uniformity, the only practicable method of varying pore size is by varying the particle sizes in the mix, so that separate mixes must be developed to meet each specific condition encountered in practice, and very fine pores can be obtained only by using a finely divided aggregate.

In our improved filter, we employ a granular aggregate but, instead of bonding the particles with a relatively small proportion of a bond which becomes solid or vitreous during curing, we employ a plastic bond which will become porous within the body of the bond itself. A plastic bond can be made to fill all of the available space between the particles of the aggregate, so that the unburned article can be made substantially non-porous. The pores are then produced artificially during the curing process. We have found it possible with this type of bond to produce a filtering medium in which the passages through the filter consist of interconnecting channels of substantially uniform diameter, which have considerable length in comparison with their cross-section.

A filtering medium in which the bond itself is porous possesses entirely different filtering properties from the usual bonded filter. When a pore size is selected which will retain the solid particles desired to be filtered out, filtration takes place almost entirely at the surface of the filter, whereas any solid matter which is small enough to enter the body of the filter passes completely through it. We have found by actual test that a filter of this type can be used where the usual bonded filter quickly clogs and becomes either sluggish or inoperative. When it is necessary to remove the sludge or filter cake from the filter, removal can be effected with comparative ease by an impulse back wash or by merely cleaning the surface, whereas with the usual filter the sludge penetrates the body of the material and can be removed only with difficulty.

With a mix containing a plastic bond which decomposes on heating, the pore size and filtering rate can be controlled to a certain degree by varying the thermal treatment during curing. This control can be effected either by altering the rate of heating, or by limiting the final temperature so that the volatile matter is not completely driven off. By merely varying the thermal treatment, it is possible to alter the filtering characteristics of the filter without changing the original mix, which is, of course, impossible with the usual bonded filter.

In a filter in which the pores are produced artificially within the bond, the uniformity of packing of the aggregate becomes of considerably less importance, and the difficulties encountered from this source in the case of a vitrified bonded filter are to a large extent eliminated.

In making our filter, any granular material of suitable melting point which is chemically resistant to the liquid being filtered can be used for the aggregate. For a carbonaceous filter, the aggregate may consist, for example, of crushed coal or coke. Other materials such as sand, fused silica, fused alumina or silicon carbide can also be used. There are a large number of plastic binders which will become porous upon curing and are thus suitable for bonding the aggregate. As examples of such bonds, we would cite tar, pitch, molasses, carbonizable waxes, silica gel, aluminum hydroxide, chromium hydroxide, or other colloidal hydroxides, as well as various ceramic bonds which can be cured so as to afford a high degree of porosity within the body of the bond without complete fusion or vitrification taking place. The bond is preferably used in such proportion that it will completely fill the intergranular spaces in the unburned article, and in many cases an excess of bond over this amount can be used if desired.

We have found that certain advantages are derived from making the filter entirely of carbonaceous material, as for example, from crushed particles of coal or coke in combination with a viscous bituminous binder such as tar or pitch. A tar or pitch binder when heated leaves a residue of fixed carbon, and offers an ideal method of producing a porous bond of controlled structure. A filter consisting entirely of carbon is chemically resistant to many materials which cannot be satisfactorily filtered through any other known medium, and when the property of the chemical resistance of the carbon is combined with the property of filtering principally or entirely through a porous bond, a filter results which is capable of many new and unique applications. Examples of specific applications for a filter of this type will be further described.

The method of manufacturing our filter will, of course, vary with the type of bond used, and modifications in the process also may be necessary with different types of aggregate. In general, any of the methods of fabrication ordinarily employed for the consolidation of plastic mixes can be used in making the filter. Several specific methods of manufacture will be described, but it should be realized that these methods are given merely as specific examples, and that other grit sizes, bond compositions, and methods of fabrication can be used. The following processes are typical of the methods used for the various types of bond and aggregate:

(1)—Filter made from a carbonaceous aggregate and a carbonaceous binder.

In making the filter from a carbonaceous aggregate, either coal or coke may be used, but coke of low ash content is very desirable, since it eliminates substances which are undesirable in the finished filter. The material can be crushed into particles of suitable size and screened or graded into the fractions if desired. The exact size of the particles is not of great importance, since filtration takes place largely through the pores in the bond, but the permeability of the filter can, of course, be altered to some degree by changing the particle sizes, since this factor changes the relative distribution of aggregate and bond. A bituminous binder such as pitch can be used as the bonding agent. The following are typical examples of mixes which can be used:

Mix No. 1—Mix containing relatively coarse particles. 70% coke, through 14 mesh and on 28 mesh; (Tyler screens, particle sizes .0328 to .0232 inch) 30% pitch.

Mix No. 2—Mix containing relatively fine particles. 70% coke, through 65 and on 100 mesh; (particle sizes .0082 to .0058) 30% pitch.

Mix No. 3—Mix containing a wide range of particle sizes. 45% coke, through ⅜ and on 200 mesh; 30% coke, 50% of which is through 200 mesh; 25% pitch.

The above mixes contain sufficient pitch to substantially fill the intergranular spaces between the aggregate particles. The amount of pitch required to fill the intergranular spaces will depend upon the nature of the granular mix, and the pitch content can be increased so as to provide an excess over that necessary to fill the pore spaces if desired.

When a tar or pitch binder is used, any of the methods of fabrication usually employed for such materials can be used for the consolidation of the mix. For example, the mix can be heated so as to impart the proper plasticity to the binder, and the hot mix extruded into a block of the proper cross-sectional area, which can be cut into any desired shape. The mix can also be consolidated by a jolting process, as described in the Reissue Patent, No. 18,062, to V. C. Doerschuk. The carbon filter material can be cut to shape either before or after the article has been subjected to the final baking process.

After the mix is consolidated, the article or block is covered with coke, sand or other inert material or surrounded with a non-oxidizing atmosphere and is heated very slowly until the volatile matter is completely driven off. The initial heating up to a dull red heat should be controlled very carefully, as both the pore size and the mechanical strength of the finished article are dependent upon the rate of heating during this period. I have found that a rise in temperature of 3½° C. per hour up to 625° C. is satisfactory for Mix No. 1 given above, and that a rise in temperature of 8° C. up to 500° C. can be used in the case of Mix. No. 3. After the volatile matter is completely driven off, the temperature is raised to approximately 950° C. to 1000° C. for the final baking operation. The carbon filter must, of course, be protected from oxidation during cooling until a comparatively low temperature is reached, whereupon the material is ready for use.

By varying the rate of heating from the schedule given above, or by varying the final temperature so as to control the amount of shrinkage of the bond, the pore size in the filter can be varied over a considerable range without impairing the mechanical strength of the article. Extremely rapid heating should, however, be avoided as too rapid decomposition of the binder may result in the disintegration of the article.

A carbon filter made by the process above described is characterized by passages through the filter which are made up principally of small interconnected channels or capillaries having a length several times that of their diameter. While there may be a considerable number of large or irregular shaped pores within the filter, these larger pores are scattered and are usually interconnected by the narrow channels so that filtration takes place through the channels and not through the larger pores. These channels extend to the surface of the filter, so that the entrance of solid matter is prevented, whereas the liquid flows through the channels in the bond. The inner surfaces of the channels are comparatively smooth, and present a marked contrast to the rough pore spaces characteristic of intergranular pores.

For the examination of the pore structure of the filter, the material can be impregnated with sulphur and a surface prepared by polishing. A filter made in accordance with the process above described is characterized by a large number of minute interconnecting channels which are almost capillary in nature and have a length which usually is about four or five times their diameter. In specific instances this length may be as great as ten times the diameter of the channel. The diameter of the small channels is also comparatively uniform, although of course there may be larger irregular shaped pores scattered through the filter. Such a structure is not obtained with the usual bonded filter.

In molding a carbon filter, we have found that there is a certain "skin effect" at the surface of the molded object which greatly alters the rate of filtering. This is particularly true in the case of extrusion, where fabrication tends to work the fines and the pitch to the outer surface. During the curing of the article the surface also is acted upon by the surrounding gases so as to cause non-uniformity of the surface layer. Upon removal of this layer, the filter functions as a decidedly more porous body, and for most applications, especially where uniformity or rapid filtering are important factors, the removal of the surface skin is of great advantage. In certain instances, however, the properties of the surface layer can be utilized, since the effect is usually one of producing a slower filter or one of finer porosity. The removal or non-removal of the surface portions of the molded article thus provides a certain amount of control for varying the pore size and the rate of filtering.

The surface layer can be removed by any suitable means as, for example, by sand-blasting or machining. Although a carbon body of the type described is very readily machined, it is also possible to sand-blast the article to its final shape if desired.

(2)—Filter made from an inorganic aggregate material and a carbonaceous bond.

In making a filter from an inorganic aggregate material, silicon carbide may be given as a typical example, although fused alumina, sand, and other similar materials are also satisfactory. The following silicon carbide mix has been found satisfactory:

75% silicon carbide, through 65 and on 100 mesh; 25% pitch.

In the fabrication of such a mix, the jolting process referred to above has been found very satisfactory. The heated mix can be placed in a mold, which is preferably heated during the jolting operation, and pressure is applied to the top surface of the mix during jolting. After the consolidation of the mix, the article can be cured substantially in accordance with the procedure given for the curing of a filter consisting entirely of carbon.

(3)—Filter made from an inorganic bond.

As an example of the manufacture of a filter from an inorganic bond, we have found that certain clays, or mixtures of clay, feldspar and various fluxing agents will form a porous bond if fired to a temperature below that of vitrification or complete fusion. These bonds are plastic and can be used in sufficient quantity to substantially fill the intergranular pore spaces in the uncured article. The following mix has been found satisfactory:

60% fused alumina, through 14 and on 36 mesh; 40% bond composition composed of: 41% Albany clay, 30% feldspar, 10% flint, 2% $MgCO_3$, 2% $CaCO_3$, 15% borax glass.

The dry ingredients of the bond are thoroughly mixed, and the bond is then mixed with the fused alumina grain. Sufficient water is added to the mix to make it plastic, and the mix is then consolidated. Tamping or jolting can be used for consolidation. The formed article is then heated to a temperature of approximately 800° C., the rate of heating and length of time during which the filter is held at this temperature depending upon the size of the article and the uniformity of temperature attainable in the furnace. For a plate one inch in thickness, a rise in temperature of 25 to 50° C. per hour and the maintenance of the final temperature for two hours has been found satisfactory. The bond becomes completely fluid at approximately 1000° C., but at 800° C. it is converted to a porous mass characterized by numerous tubular channels.

A filter composed entirely of carbon has proved very successful in many applications where filtering has hitherto presented a very difficult problem or has been impossible. Among these various applications are the replacement of the usual perforated bottom in the "blow pit" used in connection with a paper pulp digester, the recovery of fiber from the so-called "white water" or water from which pulp has been extracted in connection with the manufacture of paper, the filtration of rosin paper sizing liquor, the filtration of calcium hypochlorite paper bleach, and also the filtration of salt brine for recirculation in the manufacture of electrolyte chlorine, of process sulphuric acid containing chlorine, and of alkalies, hydrofluoric acid and many other corrosive liquids which either attack the usual filter or from which very finely divided solids could not be removed by any process previously known. I have also found a material of the type described very useful for the diffusion of gases, and particularly for the diffusion of chlorine in connection with the purification of water, and also in connection with sewage disposal. A filter of this type has also proved of great value in the filtration of dust or other solid material suspended in a gaseous medium.

The use of a carbon filter as a porous medium in the bottom of the blow pit for a paper pulp digester has solved a problem which has caused great difficulty. In the manufacture of paper, the pulp is digested with various chemical reagents under steam pressure before it is supplied to the paper machine. The digester is then "blown", the operation consisting of discharging the contents of the digester under steam pressure into an adjacent tank or "blow-pit", so that the pulp will strike a target located within the tank. After the digester is blown it is necessary to drain out the excess liquor and to wash the pulp, and a false bottom is inserted in the tank in order to filter off the liquor without removing the pulp. As the digester is discharged under a comparatively high stream pressure, the temperature fluctuations in the bottom of the blow pit are very severe, and the usual bonded filters have proved unsatisfactory owing to breakage. For this reason it is customary to use a perforated bottom made either of wood or tile for the draining of the liquor. The perforated bottom is made up of blocks or plates containing holes approximately ⅛" in diameter. These holes have a tendency to plug, and even with ceramic tile there is also a certain amount of breakage. The pulp losses are furthermore appreciable; these losses may average approximately one half per cent, and in certain cases are as high as two per cent. A carbon filter having a porous carbonaceous binder will not only withstand any temperature condition encountered in the blow pit, but will permit rapid draining of the liquor with no loss of pulp. Even with continued use, the carbon filter does not become clogged, whereas the usual perforated bottoms clog even when the holes are ⅛" or more in diameter.

A carbon filter with a porous carbonaceous bond affords a more effective medium for the recovery of pulp fiber from the "white water" from a paper machine than the methods ordinarily employed for the purpose. In operating the usual paper machine the pulp is suspended in water and fed to the wire cloth upon which the paper sheet is made, and the liquid from which the pulp is extracted, but which still contains a small quantity of residual pulp or fiber is called "white water". The white water is usually fed to a "save-all" which consists of a rotary wire screen filter. These "save-all" screens do not remove all of the fiber, so that in the waste white water there is a certain amount of pulp loss. Owing to the finely divided nature of the pulp, its fibrous characteristics and its tendency to plug the ordinary filter, filtration by other methods than the "save-all" heretofore has not proved successful. We have found that with a carbon filter containing a porous carbonaceous bond that the fiber can be completely removed and that such filtration can be effected at a very rapid rate. A filtering rate of 3000 gallons per square foot per hour can be attained with no loss of pulp.

Another application in connection with the paper industry of a carbon filter containing a porous bond is the filtration of rosin paper sizing liquor. As far as we are aware, this liquor has not been filtered successfully by other methods.

The filtering of calcium hypochlorite paper bleach has also been unsatisfactory with methods of filtering heretofore employed. The liquor obtained during the manufacture of this product has a high free chlorine content and usually contains a heavy sludge which will clog the finest grade of vitrified bonded filter in a very few minutes. A sand filter also clogs, usually in about 20 minutes. We have found that a carbon filter containing a porous bond will satisfactorily filter this liquor with no plugging of the filter, and that the cake formed at the surface of the filter can be readily removed. Even with this heavy sludge a filtering rate of from two to three gallons per square foot per hour can be obtained with a seven inch vacuum. The filter can also be used for filtering the paper bleach liquor during its use in the manufacture of paper.

Many solutions containing calcium have a tendency to deposit insoluble calcium compounds when kept in contact with most solid materials, and these lime deposits have been a source of very great difficulty in many filtering operations. With most filtering media the lime deposit will accumulate within the pores of the material and often will completely clog the filter. Carbon possesses a very unusual property in that lime deposits will not form on its surface or within the pores of the carbon, even under conditions where a heavy deposit is produced in the case of other materials ordinarily used for filtering. The phenomenon of "liming" is not completely understood, but the difference between carbon and other materials such as ceramic bodies or fabric may be due to a difference in adsorption of various ions or a difference in electromotive behavior. The unique property of carbon in preventing the deposition of lime or insoluble calcium compounds makes possible the rapid filtration of many calcium solutions over prolonged periods of time under conditions where the usual filters plug and soon become inoperative.

In a blow pit, heavy deposits of lime occasionally occur as a result of improper conditions during digestion of the pulp. Such a lime deposit will clog the pores of the usual filter, whereas a carbon filtering medium of the type herein described will retain its filtering characteristics, and any sludge retained on the surface of the filter can be readily removed.

Another filtration problem which has been successfully solved by a carbon filter is the filtration of salt brine for recirculation in the manufacture of electrolytic chlorine. The brine contains a certain amount of finely divided solid matter and very slow filtration is necessary with the usual filtration methods in order to remove minute traces of suspended material. A sand filter is usually employed, and the filtering rate is only about 15 gallons per square foot per hour. With a carbon filter containing a porous bond, the brine can be filtered at the rate of 100 gallons per square foot per hour and with this filtering rate the minute traces of solid matter are completely removed.

Many strong acids and corrosive chemicals can be filtered with a carbon filter, whereas filtration through other filtering media is either unsatisfactory or impossible. For example, process sulphuric acid, which contains free chlorine, is one of the most difficult liquids to filter, owing to its high viscosity, the fine state of subdivision of the suspended solid matter and the corrosive action of the acid itself, and as far as we know this material heretofore has not been successfully filtered. With a carbon filter of the type described, filtration can be satisfactorily effected, the filtering rate being approximately one fourth gallon per square foot per hour.

A 50% solution of phosphoric acid containing 2% of sulphuric acid and 1% of hydrofluoric acid can be filtered through a carbon filter at a temperature of 115° C. without any injurious action to the filter. Strong hydrofluoric acid also can be filtered either hot or cold without the acid chemically attacking the filter. Hydrofluoric acid will attack any form of siliceous filter, and filters containing a vitrifiable bond ordinarily contain considerable percentages of silica.

A carbon filter is chemically resistant to strong alkalies and forms an excellent medium for filtering caustic solutions, which attack the materials ordinarily used in the manufacture of filters.

Another important application for a carbon filter is the filtration of water. The speed of the filter made by the process above described exceeds that of the fastest sand filter, and the finely divided suspended matter is completely removed.

A carbon filter can also be used for filtration in connection with sewage disposal. The material will not only remove the sludge without clogging the filter, but it produces a dense filter cake which can be readily removed from the surface of the filter. The carbonaceous filter is not attacked by strong alkalies, so that it can be freed from organic matter by alkali treatment without damage to the filter. Strong alkalies attack practically any siliceous material such as is used in the manufacture of the usual bonded filter.

A filter having a porous bond can be used successfully as a gas diffusing medium, and offers many advantages over the various types of diffusion apparatus heretofore used. As an example, the fabric employed in the usual tube filter is known to be unsatisfactory for the diffusion of gases, since diffusion takes place at points nearest the gas outlet, whereas the remainder of the material is practically inactive. We have found that a filter with a porous bond offers sufficient resistance to gas flow to assure uniformity of diffusion throughout the length of the tube. A carbon diffuser has been found particularly applicable for this purpose. Gas dispersing media made in accordance with our process can also be used for the diffusion of chlorine and other corrosive gases in connection with water purification and sewage disposal. For these applications a carbon diffusing medium offers special advantages, owing to the chemical inertness of the material and the accentuated channel-like pore structure which can be obtained with a bituminous bond. Owing to the common practice of using bonded filtering media for gas diffusing purposes, we include in the term "filter" and "filtering medium" any gas diffusing body having the structure herein described.

A filter of the type described can be used very effectively for the removal of dust and other finely divided suspended solids from gases. The ordinary collectors used for this purpose will not function satisfactorily even at moderately high temperatures, or at high pressures or under vacuum, whereas a bonded filter will remain unaffected at any temperature or pressure ordinarily encountered. For this particular use, the prevention of clogging and the removal of the collected dust is very important, and the structure obtained with a porous bond offers the same advantage in this connection that it does in the filtration of a liquid. With the usual vitrified bonded filter, the dust penetrates the body of the filter, whereas with the filter of the type described, and particularly with a carbonaceous filter having a pronounced channel-like pore structure, the dust can be removed by merely cleaning the outer surface. By referring to the filtration of fluids, we intend to include both the filtration of liquids and gases.

Having thus described our invention, we claim:

1. A filtering medium comprising a bonded aggregate, the particles of the aggregate being embedded in a porous bond, which fills the intergranular spaces in the aggregate with the exception of the pore spaces within the body of the bond.

2. A bonded filtering medium comprising an aggregate of discrete particles embedded in a porous carbonaceous bond, which fills the intergranular spaces in the aggregate with the exception of the pore spaces within the body of the bond.

3. A bonded filtering medium comprising an aggregate of carbonaceous particles embedded in a porous carbonaceous bond, which fills the intergranular spaces in the aggregate with the exception of the pore spaces within the body of the bond.

4. The method of making a filtering medium which comprises forming a mix of granular particles, adding a bonding material which will become porous on curing, the said bonding material being in sufficient quantity to substantially fill the intergranular pores of the said mix after consolidation, consolidating the said mix and binder into a mass having substantially zero porosity, and curing the said filtering medium to effect a substantial degree of porosity within the bond.

5. The method of making a filtering medium which comprises forming a mix of granular particles, adding a carbonaceous bonding material which will become porous on heating, the said bonding material being in sufficient quantity to substantially fill the intergranular pores of the said mix after consolidation, consolidating the mix and the binder, into a mass having substantially zero porosity and heating the said filtering medium to effect a substantial degree of porosity within the bond.

6. The method described in claim 5, in which the granular particles are carbonaceous.

7. A porous body adapted for filtration, gas diffusion and the like, said body comprising a bonded aggregate in which the pores are completely filled with a porous carbonaceous bond, and means for forcing a fluid through the said porous body.

8. A porous body adapted for filtration, gas diffusion and the like, said body comprising a bonded aggregate in which the pores are completely filled with a porous carbonaceous bond, and means for forcing a liquid containing suspended solid matter through the said porous body.

9. A porous body adapted for filtration, gas diffusion and the like, said body comprising a bonded aggregate in which the pores are completely filled with a porous bond, and means for forcing a gas through the said porous body.

BARTLEY E. BROADWELL.
LEROY C. WERKING.